(12) United States Patent
Schools et al.

(10) Patent No.: US 12,726,795 B2
(45) Date of Patent: Sep. 1, 2026

(54) COMMUNICATIONS NETWORKS USING SITUATIONAL INFERENCE

(71) Applicant: Catalyst Communications Technologies, Inc., Forest, VA (US)

(72) Inventors: John M Schools, Forest, VA (US); Robin Grier, Forest, VA (US)

(73) Assignee: Catalyst Communications Technologies, Inc., Forest, VA (US)

(*) Notice: Subject to any disclaimer, the term of this patent is extended or adjusted under 35 U.S.C. 154(b) by 300 days.

(21) Appl. No.: 18/670,784

(22) Filed: May 22, 2024

(65) Prior Publication Data

US 2024/0397288 A1 Nov. 28, 2024

Related U.S. Application Data

(60) Provisional application No. 63/468,284, filed on May 23, 2023.

(51) Int. Cl.

| | |
|---|---|
| ***H04W 4/10*** | (2009.01) |
| ***H04L 43/04*** | (2022.01) |
| ***H04W 24/08*** | (2009.01) |
| ***H04W 76/45*** | (2018.01) |

(52) U.S. Cl.

CPC ............... *H04W 4/10* (2013.01); *H04L 43/04* (2013.01); *H04W 24/08* (2013.01); *H04W 76/45* (2018.02)

(58) Field of Classification Search

CPC ....... H04W 4/10; H04W 76/45; H04W 24/08; H04L 43/04

See application file for complete search history.

(56) References Cited

U.S. PATENT DOCUMENTS

| | | | |
|---|---|---|---|
| 1,200,101 | A | 10/1916 | Gray |
| 7,643,445 | B2 | 1/2010 | Mills et al. |
| 7,974,650 | B2 | 7/2011 | Chowdhury et al. |
| 8,059,613 | B1 | 11/2011 | Barrow et al. |
| 8,634,799 | B1 | 1/2014 | Economy et al. |
| 8,805,382 | B2 | 8/2014 | Rahman et al. |
| 8,886,244 | B2 | 11/2014 | Miller et al. |
| 8,929,938 | B2 | 1/2015 | Koren et al. |

(Continued)

*Primary Examiner* — Duc C Ho
(74) *Attorney, Agent, or Firm* — Adams Intellex, PLC

(57) ABSTRACT

Techniques for communication based on communications networks using situational inference are disclosed. Push-to-talk (PTT) services are accessed over a first communications system. The first communications system provides PTT over broadband services. The first communications system includes server-based connectivity. Additional PTT services are provided over a second communications system. The second communications system implements a different network protocol from the first communications system. The second communications system includes server-based connectivity. A client system is coupled to one or more servers in at least the first communications system. The coupling a client system to one or more servers includes two or more communications systems. The first communications system and the second communications system are coupled to each other using the server-based connectivity. PTT services activity over the at least the first communications system is monitored. A community operational situation is inferred, based on data obtained during the monitoring.

26 Claims, 7 Drawing Sheets

(56) References Cited

U.S. PATENT DOCUMENTS 9,088,876 B2 7/2015 Patel et al.
9,100,988 B2 8/2015 Vilmur et al.
9,301,133 B2 3/2016 Fumarolo
9,426,433 B1 8/2016 Mazzarella et al.
9,578,469 B2 2/2017 Ruelke et al.
9,615,218 B2 4/2017 Mazzarella et al.
9,654,200 B2 5/2017 Mazzarella et al.
9,674,810 B2 6/2017 Juncker et al.
9,681,301 B2 6/2017 Mazzarella et al.
9,871,575 B2 1/2018 Wengrovitz et al.
10,250,936 B1 4/2019 Lim et al.
10,263,415 B1 4/2019 Bartels et al.
10,341,609 B1 7/2019 Lim et al.
10,410,097 B2 9/2019 Mazzarella et al.
10,425,986 B2 9/2019 Tian et al.
10,630,845 B2 4/2020 Johanning et al.
10,826,683 B2 11/2020 Mazzarella
10,841,774 B2 11/2020 Gong et al.
10,862,932 B2 12/2020 Mazzarella et al.
10,863,525 B1 12/2020 Vivanco et al.
10,873,348 B2 12/2020 Faraone et al.
10,873,951 B1 12/2020 Hiben et al.
10,911,449 B2 2/2021 Shah et al.
10,943,123 B2 3/2021 Wengrovitz et al.
11,032,515 B2 6/2021 Mazzarella et al.
11,064,317 B2 7/2021 Mazzarella et al.
11,138,480 B2 10/2021 Mazzarella et al.
11,281,913 B2 3/2022 Wengrovitz et al.
11,343,687 B1 5/2022 Ruelke et al.
11,363,611 B2 6/2022 Vivanco et al.
11,425,333 B2 8/2022 Mazzarella et al.
11,449,961 B2 9/2022 Siddoway et al.
2008/0045204 A1 2/2008 Takano et al.
2011/0161441 A1 6/2011 Haruna et al.
2013/0029714 A1 1/2013 Koren et al.
2013/0231100 A1* 9/2013 Sharma .................. H04W 4/50 455/418
2014/0177622 A1 6/2014 Juncker et al.
2014/0241306 A1* 8/2014 Pison ..................... H04W 4/10 370/329
2015/0281170 A1 10/2015 Patel et al.
2016/0227384 A1* 8/2016 Mazzarella ........... H04W 4/021
2021/0050993 A1 2/2021 Mazzarella
2021/0068124 A1 3/2021 Vivanco et al.
2021/0195140 A1 6/2021 Mazzarella et al.
2021/0250393 A1 8/2021 Mazzarella et al.
2021/0368133 A1 11/2021 Mazzarella et al.
2021/0399272 A1 12/2021 Arendell et al.
2022/0084692 A1 3/2022 Wengrovitz et al.
2024/0251224 A1* 7/2024 Schools .................. H04W 4/16

* cited by examiner

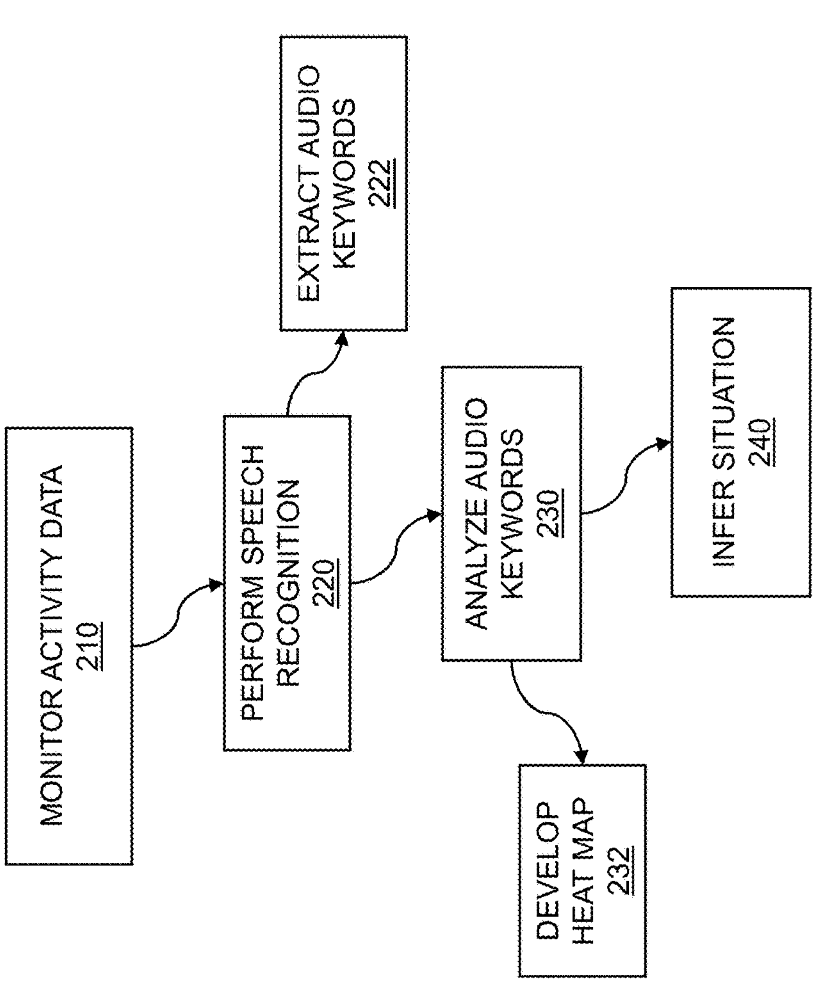
FIG. 2

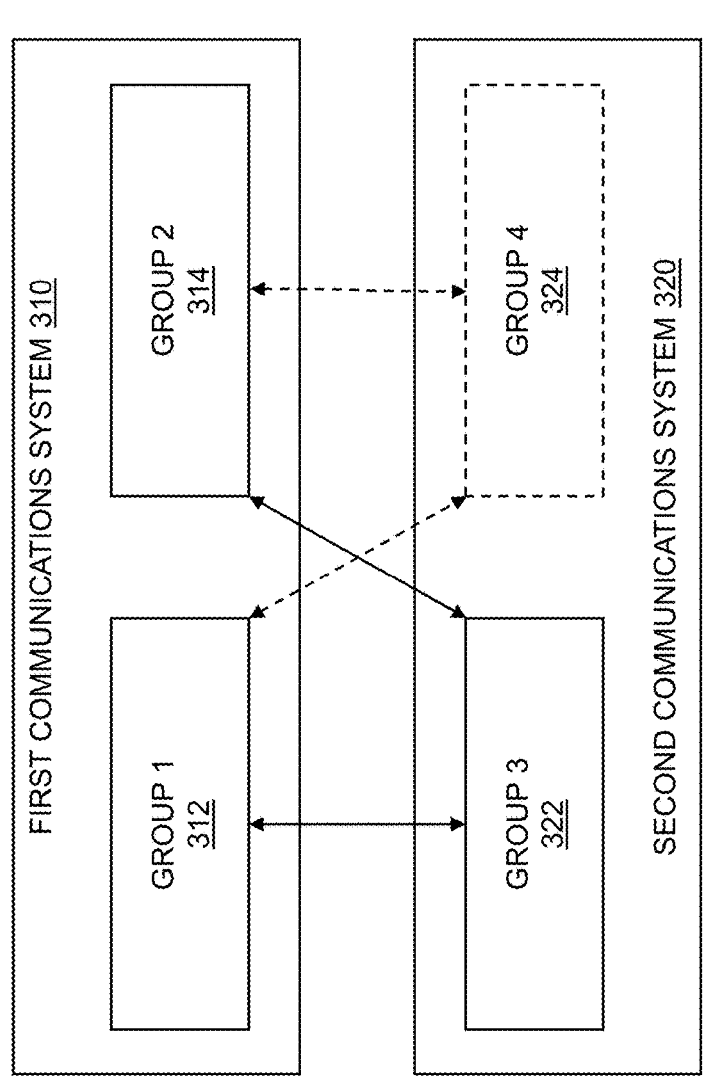
FIG. 3

400

| METADATA |
|---|
| RADIO IDENTIFICATION |
| TALKGROUP IDENTIFICATION |
| TALKGROUP MEMBERSHIP |
| TALKGROUP PATCHING |
| COMMUNICATION DURATION |
| COMMUNICATION TIME OF DAY |
| COMMUNICATION LOCATION |
| RADIO STATUS TRANSITION |
| COMMUNICATION RECIDIVISM |
| RESPONDER BIOMETRICS |
| RESPONDER VEHICLE SPEED |
| RESPONDER VEHICLE DIRECTION |
| DATA MESSAGES WITH VOICE |
| EN ROUTE/INCIDENT WEATHER |
| EN ROUTE TRAFFIC METRICS |

COMMUNICATIONS NETWORKS USING SITUATIONAL INFERENCE

RELATED APPLICATIONS

This application claims the benefit of U.S. provisional patent application "Communications Networks Using Situational Inference" Ser. No. 63/468,284, filed May 23, 2023.

The foregoing application is hereby incorporated by reference in its entirety.

FIELD OF ART

This application relates generally to communications and more particularly to communications networks using situational inference.

BACKGROUND

The discovery of radio waves and the invention of wireless communications devices and techniques has enabled the transfer of information over various media. Primitive "wireless" techniques included semaphores and signal fires. New systems were invented that could be operated day or night and in virtually any weather conditions. An early wireless information transfer system included the "photophone" which transferred audio using light. Electromagnetic induction systems were extensively researched for their communication capabilities. One electromagnetic system was developed which coupled a moving train to nearby telegraph cables, but these early electromagnetic systems operated only over short distances. Electrical systems were investigated for wireless telegraphy. These wireless telegraphic systems were based on sending a current through a medium such as water or the ground. Unsurprisingly, these wireless systems were only useful over short distances due to signal attenuation. Not until radio waves were used for the telegraphic systems did a major wireless breakthrough occur. Using radio waves, information could be transferred over both short and long distances, and to more than one recipient at once. Significant interest developed for using radio waves to communicate messages of various types, including routine messages, military messages, and emergency messages, among many other types.

Historically, radio transmitters and receivers were primitive devices. The transmitter included a spark gap that caused a spark to arc between two electrodes. These transmitters generated many frequencies, including audio, radio, and even light. Spark gap signals were detected using a device called a coherer. This device used metal particles between two electrodes. When a signal was detected, the metal particles would form a bridge between the electrodes, enabling an electric current to flow. Advanced and improved radio transmission and reception resulted from development of transmitters and receivers that could respectively transmit and detect signals. Thus, continuous wave or CW signals could be transmitted to relay Morse code messages. Modulation techniques emerged for transmission of audio signals. These modulation techniques included amplitude modulation (AM), followed by frequency modulation (FM).

The advancement and diversity of techniques for transmitting and receiving radio signals has been remarkable. These techniques have enabled access to previously unreachable higher frequency bands. The higher frequency bands provide wider frequency ranges for wireless communications. The techniques further enable larger numbers of signals to be transmitted simultaneously. New analog and digital modulation techniques are continuously being developed. These new techniques take advantage of the expanded radio frequency spectrum available for communication. Such modulation techniques include amplitude shift keying (ASK), frequency shift keying (FSK), and quadrature shift keying (QSK), among many variants. One interesting modulation technique is based on spread spectrum usage. Originally developed to hinder both detection and jamming in military wireless signals, spread spectrum techniques are now commonly used in civilian applications such as cellular telephony.

SUMMARY

Radio frequencies, channels, and so on have been assigned to organizations, agencies, departments, corporations, and others. While these frequencies and channels can be assigned within the same radio band, the assigned frequencies and channels can vary from group to group. The result of such assignments has been limited or no communications interoperability between radio spectrum user agencies and the user devices employed by the agencies. This situation is a direct result of the agencies using different communications systems, channels, access codes, etc. While network congestion may be reduced and secure radio operations may be supported by assigning and using divergent channels, user devices, and so on, communications system interoperability can be severely hampered. However, communications system interoperability is highly desirable in many situations. Providing communications system interoperability is an expensive and resource-intensive undertaking. Enabling communications between communications systems typically requires developing and maintaining the interoperability capabilities. The interoperability can be accomplished by routing data between and among communication systems. In addition, the interoperability of the communications systems can enable inferring a community operational situation. A community operational situation can include a routine or approved situation such as concert, a peaceful demonstration, or a political rally. Other community operational situations can result from fires, police actions, riots, disasters, or other events that result in an increase or "hot spot" of communications traffic in a given area. By monitoring such traffic, and by analyzing the traffic for user devices involved in communication, a confluence of user devices, etc., the inferring the community operational situation can be enabled. The inferring can be based on training a machine learning model using historical data. When data collected during monitoring is analyzed by the machine learning model, similar community operational situations can be inferred. An alert can be sent to a dispatcher, manager, office, or other point of contact in order to form a response to the situation.

Communications are accomplished with communications networks using situational inference. Push-to-talk (PTT) services are accessed over a first communications system, wherein the first communications system provides PTT over broadband (PTToB) services, and wherein the first communications system includes server-based connectivity. Additional push-to-talk (PTT) services are provided over a second communications system, wherein the second communications system implements a different network protocol from the first communications system, and wherein the second communications system includes server-based connectivity. A client system is coupled to one or more servers in at least the first communications system. PTT services activity is monitored over the at least the first communications system. A community operational situation is inferred, based on data obtained during the monitoring.

A computer-implemented method for communications is disclosed comprising: accessing push-to-talk (PTT) services over a first communications system, wherein the first communications system provides PTT over broadband (PTToB) services, and wherein the first communications system includes server-based connectivity; providing additional push-to-talk (PTT) services over a second communications system, wherein the second communications system implements a different network protocol from the first communications system, and wherein the second communications system includes server-based connectivity; coupling a client system to one or more servers in at least the first communications system; monitoring PTT services activity over the at least the first communications system; and inferring a community operational situation, based on data obtained during the monitoring. In embodiments, the coupling a client system to one or more servers includes two or more communications systems. In embodiments, the first communications system and the second communications system are coupled to each other using the server-based connectivity. In embodiments, the first communications system and the second communications system operate incommunicado. Some embodiments comprise comparing the data that was obtained with historical monitoring data collected over time.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 2 is a flow diagram for enabling communications networks with situational inference.

FIG. 3 shows two-way communication between communications systems using situational inference.

FIG. 4 illustrates metadata examples for a communications network using situational inference.

DETAILED DESCRIPTION

Figure 1:
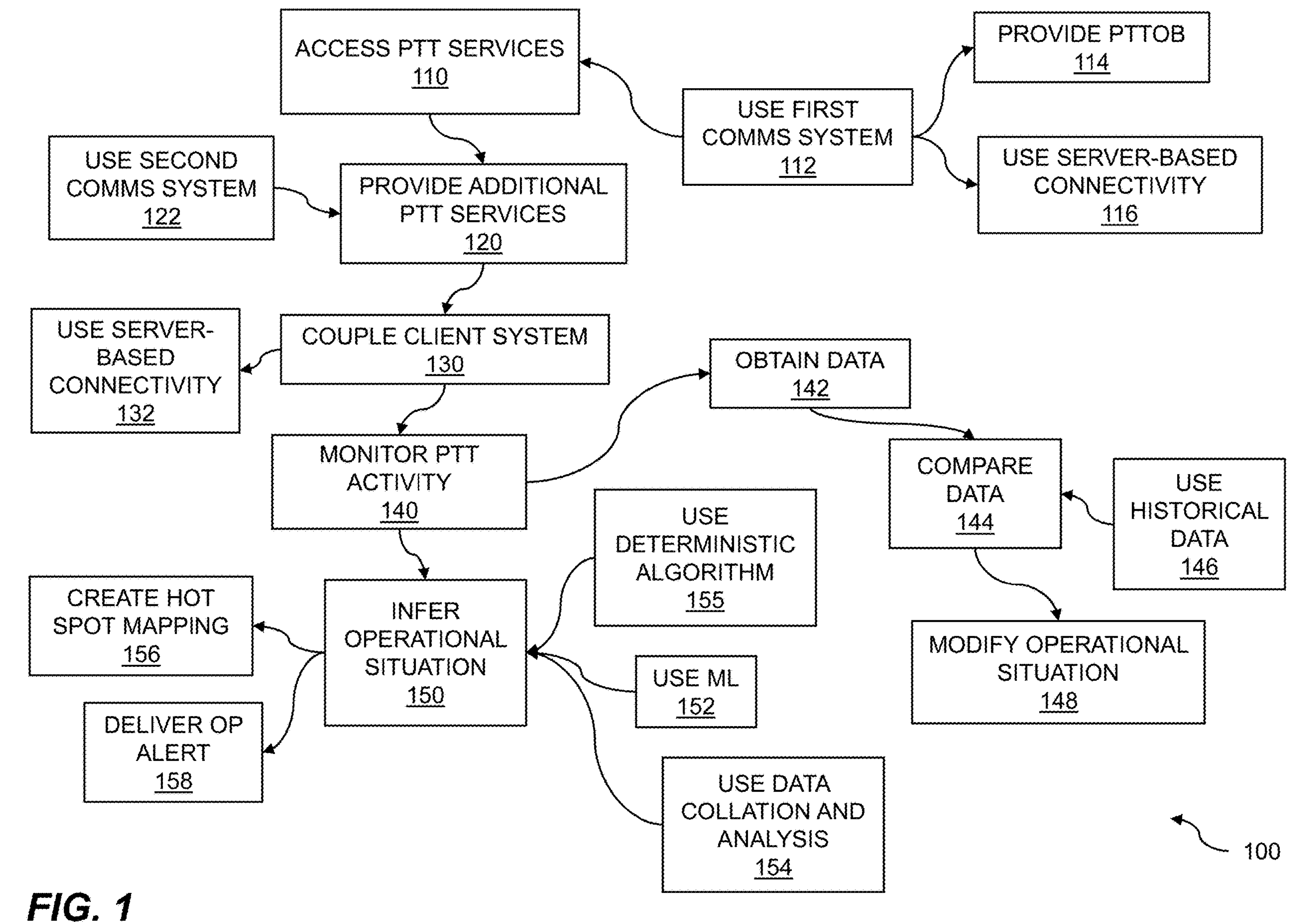
FIG. 1 is a flow diagram for communications networks using situational inference.

Techniques for communications based on communications networks using situational inference are disclosed. The exchange of data via radio is based on propagation of electromagnetic waves. Since its first discovery and implementation, radio transmission and reception has enabled techniques for wireless communications over distances long, medium, and short. The radio frequency (RF) spectrum, which is generally defined as 0 Hz to 3 THz, is partitioned into various bands. The bands each include various propagation characteristics, bandwidths, data transmission rates, and so on, and thereby lend themselves to different communications capabilities, capacities, and purposes. The extremely low frequency band (ELF) and very low frequency band (VLF), which can include frequencies between 3 Hz and 30 Hz and 3 kHz and 30 kHz respectively, can be used to communicate with submerged submarines. However, for these bands, antenna systems are very large-on the order of kilometers—and data transmission rates are very low. At the other end of the RF spectrum, microwaves, which can include frequencies between 1 GHz and 1000 GHz (1 THz), can transmit very large amounts of data using small antennas or dishes. Microwave communications tend to be used for high bandwidth, line-of-sight applications over relatively short distances because the signals attenuate rapidly over distance, disperse in rain and snow, etc. Some of the bands are also used for scientific and other experimentation and for gathering research and other data. Because of these vastly different capabilities, use of the various RF bands is regulated by international organizations such as the International Telecommunications Union (ITU), treaties among countries, individual governments, government agencies such as the Federal Communications Commission (FCC) and the like. There are numerous competing public, private and other uses for the RF bands, including AM broadcast, shortwave, aviation, and government. Public safety, business, FM broadcast, digital television, emergency broadcast such as NOAA Weather Radio (NWR) All Hazards, cellular telephony, and satellite links, among many, many more, also compete for RF bands.

Public services, such as fire, police, and emergency medical services, are typically assigned different frequencies or "channels" within a band that is shared by the services. The assignments are made to reduce channel congestion for each service, to enable communications to proceed without causing unrelated or unnecessary transmissions that interfere with the other services, and so on. Further, the public services channels can be assigned within different bands such as the very high frequency (VHF) and ultra-high frequency (UHF) bands. As a result, communications within a department or agency, let alone communications between departments and agencies, can be incompatible, difficult, or impossible. Although continuing progress toward interservice or interagency interoperability is being made, particularly in the wake of the 9/11 terrorist attacks, Hurricane Katrina, and other human-caused and natural disasters, interagency communications in general remain highly problematic. Law enforcement agencies such as state and local police, ATF, FBI, and emergency medical services still encounter interagency communication incompatibility issues. These issues tragically continue to hinder responses to emergency situations such as active shooter events. When communication between communications systems such as agency communications systems are enabled, communications such as text messages, individual voice calls, talkgroup voice calls, videos, and file sharing, etc., can be enabled between groups associated with the agencies. Further, when a data link fails, becomes unreliable, or is found to be unreachable, the data can be rerouted using a redundant peer-to-peer connectivity route.

Another challenge to providing effective and timely public services is a personnel issue. Staffing at call centers remains problematic, leaving some services short staffed. Further, manually monitoring multiple data feeds such as traffic cameras, safety cameras, radio calls, telephone calls, and detector feeds from sensors such as a weather and gunshot detection sensors can easily overwhelm safety and security staff. The many data feeds are often presented on displays, where the data feeds can change over time. Thus, a person monitoring the screens can be easily distracted by a possible event on one screen while missing an event on another screen. To enhance the monitoring of the various data feeds, machine learning techniques can be applied to monitoring services such as push-to-talk services associated with one or more communications systems. A machine learning model can be trained using historical data collected over time while monitoring PTT services activity. Once trained, the machine learning model can analyze collected data for trends in the data, anomalous data, and so on. The results of the machine learning analysis can be used to infer a community operational situation. The community operational situation can require further monitoring, deployment of emergency services, and the like. Further, the machine learning model can adapt or "learn" over time in order to identify possible situations more quickly. The adapted machine learning model can converge on a result or inference faster, thereby improving utility to a dispatcher, manager, officer, etc.

Communications are accomplished based on communications networks using situational inference. Push-to-talk (PTT) services are accessed over a first communications system. The PTT services can include text messaging, individual voice calls, talkgroup voice calls, video sharing, file sharing, and so on. The first communications system can provide PTT over broadband (PTToB) services. The broadband that enables the PTToB can include a computer network such as the Internet, a cellular network, a land mobile radio (LMR) network, and the like. The first communications system can be accessible using a plurality of user devices. The user devices can include handheld transceivers (HTs), mobile transceivers, base station transceivers, software-defined radio (SDR) transceivers, and so on. The first communications system can include server-based connectivity. The server-based connectivity can enable and control the first communications system, can provide network or broadband access to the first communications system, etc. Additional push-to-talk (PTT) services are provided over a second communications system. The second communications system can be associated with a second service or agency, can have a separate user base, etc. The second communications system implements a different network protocol from the first communications system. The communications systems can be based on protocols such as Long Term Evolution (LTE) cellular, Land Mobile Radio (LMR), and so on. The second communications system includes server-based connectivity. The server-based connectivity associated with the second communications system can be substantially similar to or substantially different from the server-based connectivity associated with the first communications system.

A client system is connected to one or more servers in at least the first communications system. The client system can provide control to the first communications system, can configure the system, can monitor the system, etc. PTT services activity is monitored over the at least the first communications system. The monitoring can include collecting data such as voice and text data, system metadata such as talker ID and system information, and so on. A community operational situation is inferred, based on data obtained during the monitoring. The inferring can be accomplished using machine learning, where a machine learning model is trained using historical data collected during monitoring PTT services activity. An operational alert can be delivered, based on the inferring. The operational alert can be delivered to a dispatcher, officer, communications system manager, etc.

FIG. 1 is a flow diagram for communications networks using situational inference. Communications systems can be established to enable the exchange of individual and talkgroup voice calls, text messages, and so on among users of a communications system. The users can include amateur radio operators, subscribers, team members associated with an organization or service such as public safety, government agencies, emergency medical services, and so on. The communications systems can be accessed using a standard device configured to operate with the service, supplemental hardware, an application on a device such as a smartphone, and so on. A user of a first communications system can communicate with a user of a second communications system when there is a link established between the first communications system and the second communications system. The link can enable the transfer of text messages, individual calls, and talkgroup calls between the two communications systems. A client system can be coupled to one or more servers. The one or more servers can be associated with a first communications system, a second communications system, and so on. The communications can be monitored. The monitoring can include monitoring push-to-talk (PTT) services activity over at least one communications system. The monitoring can capture data such as voice call data, text data, and metadata. The metadata can be associated with a communications system and can include radio identification and talkgroup identification; communication duration, time of day, and location; etc. The collected data can be processed using a machine learning model, comparted to historical data, and so on. A community operational situation can be inferred from the data obtained during the monitoring. An operational alert can be delivered to a control operator such as a dispatcher, based on the inferring. The delivered alert can provide information to the dispatcher that otherwise can be missed, overlooked, or not acted upon in a timely manner.

Data can be transferred using a communications channel between groups of users within a communications system, between users and groups in different communications systems, and so on. The transferring data can be accomplished using a broadband connection or network. The broadband network can include a computer network such as the Internet, a cellular network such as an LTE or 5G network, a land mobile radio (LMR) network, etc. While network connections between communications systems can at times become overloaded, become unstable or unreliable, fail, and so on, the broadband connection can be switched. The data can further include a Talker ID, GPS coordinates, mission-critical information, and so on.

The flow 100 includes accessing push-to-talk (PTT) services 110. A PTT service can enable two-way communications between a transmitting device and one or more receiving devices. The PTT service can be based on a communications model such as a half-duplex model. Half-duplex operation can enable transmitting and receiving on a channel with one transmitter and one or more receivers. One transmitter can transmit at a time. The PTT service can support one or more subaudible tones, tone codes, access codes, and so on. The tones can be used to open squelch, to enable access to a channel, and so on. The PTT service can support a repeater operation. The repeater operation can be based on a shift or offset between a receiving frequency and a transmitting frequency. A transmitter, such as a transmitter associated with a user device, can transmit to the repeater on an offset frequency with respect to the receiving frequency, thereby enabling substantially simultaneous transmission and reception.

In the flow 100, the PTT services are accomplished using a first communications system 112. The first communications system can be based on a variety of wireless communications protocols. In embodiments, the first communications system can be based on cellular protocols. The cellular protocols can include one or more standard cellular protocols. The cellular protocols can include Third Generation Partnership Project (3GPP) protocols. In embodiments, the cellular protocols can include long-term evolution (LTE) protocols. The LTE technology can include 4G technology. The cellular technology can further include 5G technology, and the like. Other 3GPP-compliant devices can include GSM, UMTS, IP Multimedia Subsystem (IMS), etc. In embodiments, the first communications system can include groups such as homogeneous groups. The homogeneous groups can be based on a specific protocol such as a 5G cellular protocol.

In the flow 100, the first communications system provides PTT over broadband (PTToB) services 114. PTToB, sometimes also referred to as broadband push-to-talk (BBPTT) enables a device such as a smartphone, tablet, etc. to communicate over a broadband network. The communications over the network can be accomplished by pushing a "button" on the smartphone. The button can include a soft button displayed on a touch screen, a programmed physical button associated with the smartphone, and the like. The PTToB can be enabled by an app running on the smartphone. The broadband network can include a cellular network, a computer network such as the Internet, etc. In the flow 100, the first communications system includes server-based connectivity 116. The server-based connectivity can enable connectivity between groups associated with a communications system, between communications system, between groups associated with different communications systems, and so on. The server-based connectivity can enable a communications protocol. The communications protocols can include cellular protocols, LMR protocols, etc. The server-based connectivity can be based on a client system-server model (discussed below).

The flow 100 includes providing additional push-to-talk (PTT) services 120 over a second communications system. As for the first communications system, the PTT service can enable two-way communication between a transmitting device and one or more receiving devices. The PTT service can be based on a communications model such as a simplex (e.g., one direction), a half-duplex model (e.g., both directions, one at a time), and so on. The PTT service can support one or more subaudible tones, tone codes, data messages that accompany the voice, and so on. The PTT services associated with the second communications system can support a repeater operation. In the flow 100, the second communications system 122 implements a different network protocol from the first communications system. In embodiments, the second communications system can include groups such as homogeneous groups each based on Land Mobile Radio protocols (LMR). LMR technology can access assigned frequencies within radio frequency (RF) bands. The radio bands can include low-VHF, VHF, or UHF bands, and so on. LMR radio technology can be used by public safety officers, emergency medical services, and the like. In embodiments, the first communications system can include a plurality of user devices. The user devices can include transceiver devices configured to operate with the first communications system. The user devices can include handheld transceiver (HT), mobile transceiver, and base station transceiver devices. The PTT service can be provided using various PTT over broadband capabilities. One or more groups such as homogeneous groups can be included in the second communications system. The one or more groups can include LMR groups independently provided by different vendors. In embodiments, the groups based on LMR protocols can include systems from two or more different vendors. The groups can be based on different LMR channels, configurations, access codes, etc. In other embodiments, the groups in the first communications system and the groups in the second communications system can enable dynamic, multi-system redundancy. The LMR protocols can support long, medium, and short distance communications. In other embodiments, the second communications system can include groups each based on near field communication (NFC) protocols. As with the first communications system, the second communications system includes server-based connectivity. The server-based connectivity can enable connectivity to a network such as a radio access network (RAN). The RAN can provide access to the radio network, can manage the radio network, etc.

The flow 100 includes coupling a client system 130 to at least the first communications system. The client system can include a system associated with a group within the first communications system. The client system can support a communications protocol such as a cellular protocol, a LMR protocol, etc. In embodiments, the coupling a client system to one or more servers can include two or more communications systems. The two or more communications systems can support substantially similar communications protocols, substantially different communications protocols, a mix of protocols, etc. In the flow 100, the first communications system and the second communications system are coupled to each other using the server-based connectivity 132. The server-based connectivity can enable peer-to-peer communications between the first communications system and the second communications system. The peer-to-peer connectivity can be established using a link between the first communications system and the second communications system. The link can be established using a link such as a network link. The network can include a computer network, a cellular network, a LMR network, etc. In embodiments, groups associated with the first communications system and groups associated with the second communications system can include a link to each other group. The links can enable sharing of data, communications system configurations, and so on. The links can include a wired connection, a wireless connection, a hybrid wired and wireless connection, an Internet connection, etc. In embodiments, the peer-to-peer connectivity can determine active communication channels among the groups. The links can include an active link and one or more inactive links. In embodiments, the first communications system and the second communications system operate incommunicado. The first communications system and the second communications system can operate such that they do not interfere with operation of the other system. The communications system can operate without intervention by an operator or dispatcher.

The flow 100 includes monitoring PTT services activity 140 over at least the first communications system. The monitoring can include monitoring communications between two user devices, communications with talk groups, video transmissions, file sharing, and so on. In the flow 100, data is collected during the monitoring 142. The data can include individual and talkgroup data such as audio data. The data can be collected during an event, during communications system operations, and so on. In embodiments, the data can be collected over time. The amount of time during which the data is collected can include seconds, minutes, hours, days, weeks, months, etc. The data collected over time can include historical data. The flow 100 further includes comparing the data 144 that was obtained with historical monitoring data collected over time 146. The historical data can include data associated with normal communications systems operation, operation during events, etc. The comparing the data can be used to discover trends in the data, changes in the data, anomalies in the data, etc. In embodiments, comparing the data can include data collation. The data collation can be based on data collected from one or more clients, communications systems, and so on. The comparing can further include data correlation, regression, etc. The comparing the data can further include data analysis. The data analysis can include data cleaning to remove spurious data or noise, data interpretation, data presentation, and so on.

In embodiments, the data that can be collected during the monitoring can include system metadata. Metadata, or "data about data", can include system information, configurations, profiles, and so on. The system metadata can be associated with classes of communications. In embodiments, the system metadata can be associated with community radio communications. Community radio communications can include routine communications associated with service and agency communications such as fire, law enforcement, and emergency services communications. In other embodiments, the system metadata can include radio identification, talkgroup identification, talkgroup membership, talkgroup patching, communication duration, communication time of day, communication location, radio status transition, and communication recidivism. The system metadata can be used to track communications volume, user device locations and concentrations, etc. The flow 100 further includes modifying the community operational situation 148, based on the comparing. Community operational situations, which can include normal or approved events, emergency events, and so on, are discussed below.

The flow 100 includes inferring a community operational situation 150, based on data obtained during the monitoring. A community operational situation can include a normal situation such as daily traffic; or normal, approved, or permitted situations such as religious services, concerts, or political rallies. In embodiments, the community operational situation can include emergency response activities. An emergency response activity can include a fire, a law enforcement activity, emergency services deployment, and so on. The community operational situation can be initiated in response to an emergency situation such as a human-caused or natural disaster. In embodiments, the inferring includes a correlation factor. The correlation factor can include a probability, a threshold, and so on. In embodiments, the correlation factor can represent a trueness or falseness metric. The trueness or falseness metric can be used to determine whether the inference of a community operational situation is likely true or unlikely (e.g., false). Various techniques can be used to accomplish the inferring. In the flow 100, the inferring can use machine learning 152. Machine learning can be based on a machine learning model. The machine learning model can be executed on an array of processors such as a neural network. The machine learning model can be trained. In embodiments, the machine learning model is trained by the historical data. The machine learning training can be based on supervised training where a training dataset and expected results or inferences are provided to "train" the machine learning model. The training includes adjusting weights and biases associated with the machine learning model to improve convergence rates to obtain the expected inference. The training can further be based on semi-supervised training, unsupervised training, and the like. Since creating a training dataset with expected inferences, or "labeling" the data, is complex, and since the training of the machine learning model is improved by providing more training data, synthetic data can be generated. In embodiments, the machine learning can be supplemented using a generative model. The generative model can be used to generate or synthesize data that can be used to train the machine learning model. The generative model can operate autonomously to generate the synthetic data. In the flow 100, the inferring can use a deterministic algorithm 155. The deterministic algorithm can comprise rules, tables, flows, and so on that yield a deterministic inference result rather than a stochastic or machine learning result. The deterministic algorithm can be based on collation and analysis of the PPT activity monitoring. The deterministic algorithm can comprise one or more deterministic algorithms.

Discussed previously, data can be collected. In the flow 100, the data such as the communications data and the metadata can be collated and analyzed 154. The collating can include collating data by communications system, time of data collection, date, location, and so on. Embodiments further include analyzing the audio keywords to develop a situational heat map. The heat map can show levels of communication, concentrations of the occurrence of keywords and phrases such as "help", "fire", or "shots fired", and so on. In other embodiments, the data can be associated with a particular community operational situation. That data can include communications between fire response teams, emergency services, and the like. The data that is collected can include audio data. The audio data can include audio associated with agency and service personnel communications, dispatcher directions and instructions, etc. The audio data can be analyzed. Further embodiments include performing speech recognition on the audio data to extract audio keywords. The speech recognition can further extract keyword phrases. In embodiments, the inferring can be based on the audio keywords. In a usage example, extracting a keyword such as "fire" or a keyword phrase such as "need backup" can be used to infer that a fire has been detected, that additional personnel are required, and so on.

The flow 100 further includes creating a hot spot mapping 156 of the community, based on the inferring. The hot spot mapping can be based on a type of communication such as individual or talkgroup communication, communication density, user device concentration, and so on. The hot spot mapping can further include anomalous communications systems operation. The hot spot mapping can include a visual rendering such as a map, a graph, a plot, and the like. The flow 100 further includes delivering an operational alert 158, based on the inferring. The operational alert can include a visual alert such as a message, test, or email; an audio alert such as a phone call or audible tones; etc. The operational alert can be rendered on a display, where the display can be monitored by an official, a manager, a net controller, etc. In embodiments the operational alert can be delivered to a dispatcher monitoring one or more communications systems. The alert can be used to assist the dispatcher by presenting information associated with a community operational situation. The presentation can be used to supplement the dispatcher's monitoring of the communications systems. The presentation can draw attention to a situation such as a developing situation that might not have been noticed yet by the dispatcher.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

FIG. 2 is a flow diagram for enabling communications networks with situational inference. Discussed previously and throughout, communications between two or more user devices can be established. The user devices can be associated with the same communications system, with different communications systems, and so on. The communications system can include systems based on substantially similar or substantially different communications protocols, channels, frequencies, bands, access codes, encryption schemes, and so on. The communications systems can be independently operated by government agencies, emergency services, various vendors, and the like. The independent communications systems can be used to establish various types of communications between and among different entities to support responses by government agencies, law enforcement, emergency response organizations, public safety departments, and others. Further, interconnection or interoperability of the communications systems is essential to sustained and effective communication during times of crisis such as natural disasters, terrorist attacks, and government actions. The inter-communications systems connectivity can be enabled by deep integration between the communications systems. Deep integration is complex to implement and maintain and is often strongly resisted by the operators or vendors of the communications systems because the systems are operated independently. One useful technique is to establish peer-to-peer connectivity between communications systems. The peer-to-peer connectivity can be based on accessing and providing capabilities of push-to-talk compliant clients and specialized apps. The communications can be established between servers associated with a group such as a homogeneous group of user devices. The homogeneous group can be associated with different communications systems. Each server can have one or more links for interconnection, where a link enables peer-to-peer connectivity between the groups. A link can include a network link such as a computer network link, a cellular network link, and the like. These network links can be used to route or exchange data for a communication channel between one communications system and another communications system.

The communications can further be monitored. The communications can be monitored to determine user device locations, user device concentrations, intersections of user devices assigned to various users, and the like. The flow 200 includes monitoring PTT services activity 210 over at least the first communications system. The monitoring can include monitoring over-the-air signals associated with one or more communications, monitoring network traffic, and so on. In embodiments, data can be obtained during the monitoring. The data can include communications system information such as channel, frequency, signal strength, signal direction, and so on. The data can be collected for analysis, collation, correlation, processing, and the like. The data can be collected over a period of time such as minutes, hours, days, weeks, etc. The data can be stored or archived, where the stored or archived data can be referenced as historical data. Further embodiments include comparing the data that was obtained with historical monitoring data collected over time. The comparing can be used to determine trends, commonalities, anomalies, etc. In other embodiments, the data can include system metadata. The system metadata can provide information about the data. The metadata can include tags, labels, identifiers, and the like. In embodiments, the system metadata can include radio identification, talkgroup identification, talkgroup membership, talkgroup patching, communication duration, communication time of day, communication location, radio status transition, and communication recidivism.

The flow 200 further includes performing speech recognition 220 on the audio data. Various techniques can be used to accomplish speech processing, speech recognition, and so on. Speech processing can be accomplished using techniques such as dynamic time warping, phase-aware processing, artificial neural networks configured for speech processing, models such as Hidden Markov models, and the like. The speech recognition can be accomplished using techniques similar to those used for the speech processing. The speech recognition can further be used to recognize individuals such as users of user devices associated with a communications system. The flow 200 further includes performing the speech recognition on the audio data to extract audio keywords 222. The audio keywords and keyword phrases can include specific words that can be associated with an agency, an organization, and so on. In a usage example, the keywords could include "fire", "rescue", "Tac 2", etc. The keywords can further be associated with detection of community operational situations. The community operational situations gatherings can include events such as concerts or political rallies, etc.

The flow 200 further includes analyzing the audio keywords 230. The analyzing the keywords can identify keywords associated with an organization, an agency, a service, and so on. In a usage example, keywords associated with a service such as a fire service can include "fire", "trapped", "team", "pumper", "ladder", etc. In another example, the keywords can include search words associated with a situation that can be important or critical. The keywords for this latter example can include "hostage", "victim", "shots fired", etc. In the flow 200, the analyzing is used to develop a situational heat map 232. The heat map can include regions of interest, where the regions of interest can be associated with one or more communications systems. The heat map can be used to render a visual display of concentrations of user devices, movement of user devices, coalescence of user devices, and so on. In embodiments, the heat map can be displayed to an official, a dispatcher, a net controller, etc.

The flow 200 includes inferring a community operational situation 240. The inferring can be based on data obtained during monitoring of activity such as PTT services activity over a communications system. The inferring can include detecting a community operational situation, determining a type of situation, and so on. The inferring can identify trends in a community operational situation, changes in the situation, and the like. In embodiments, the inferring can use machine learning. The machine learning can identify and track routine situations, anomalous events, and so on. The machine learning can assign a "level of concern" or some other metric to a situation. The level of concern can include safe, low, medium, high, critical, etc. The machine learning can be accomplished based on training a network, such as a neural network, to perform the machine learning. In embodiments, the machine learning can be trained by the historical data. The machine learning can be improved by applying more data to the training. In embodiments, the machine learning can be supplemented using a generative model. The generative model can generate synthetic data that can resemble the historical data, thereby presenting more training cases to the machine learning. Further embodiments include creating the hot spot mapping of the community, based on the inferring.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

FIG. 3 shows two-way communication between communications systems using situational inference. The two-way communication can include communication between communications systems and groups. The communications systems can be based on various communications techniques, standards, protocols, and so on. The communications systems can include wireless communications systems. In some embodiments, the communications system can include one or more groups. The groups can include homogeneous groups, where the homogeneous groups can be configured to use one or more channels, to control and access tones, to implement data compression and encryption techniques and keys, and so on. User devices configured to operate within a group can communicate with other peers within the group. The user devices can further be configured to engage in communications with more than one other user device, such as user devices associated with a talkgroup. Communications can be established within a group, between groups associated with a communications system, between communications systems, between a group associated with a first communications system and a group associated with a second communications system, and so on. Two-way communication between communications systems enables communications networks using situational inference. Push-to-talk (PTT) services are accessed over a first communications system, wherein the first communications system provides PTT over broadband (PTToB) services, and wherein the first communications system includes server-based connectivity. Additional push-to-talk (PTT) services are provided over a second communications system, wherein the second communications system implements a different network protocol from the first communications system, and wherein the second communications system includes server-based connectivity. A client system is coupled to one or more servers in at least the first communications system. PTT services activity is monitored over the at least the first communications system. A community operational situation is inferred, based on data obtained during the monitoring.

Two-way communication is shown between communications systems using situational inference 300. A first communications system 310 is included. The first communications system can be based on a wireless communications technique. The wireless techniques can include cellular techniques. The wireless techniques can further include mobile radio techniques. In embodiments, the first communications system can include a Long Term Evolution (LTE) system, a Land Mobile Radio (LMR) system, or some other wireless communications system. The first communications system can include one or more groups. The first communications system 310 can include groups such as group 1 312 and group 2 314. The groups, which can include homogeneous groups, can enable redundancy for the first communications system. The redundancy can enable communication to and from the first communications system in the event of one of the groups failing, becoming unavailable or unreliable, etc. In embodiments, the first communications system can include groups each based on cellular protocols. Various cellular protocols can be supported. In embodiments, the cellular protocols can include long-term evolution (LTE) protocols, 5G protocols, etc. The second communications system 320 can include groups such as group 3 322 and group 4 324. While two groups are shown, other numbers of groups can be associated with a communications system. In embodiments, the second communications system can include groups each based on Land Mobile Radio protocols (LMR). The LMR protocols can be supported in various frequencies, channels, radio bands, and the like. The LMR protocols can include standard, open, or proprietary protocols, etc. In embodiments, the groups based on LMR protocols can include systems from two or more different vendors. The communications systems can include channels, frequencies, radio bands, etc. that can be used for communications over various distances. The radio bands, for example, can support communications over meters, kilometers, tens of kilometers, and so on. The radio bands and techniques can support short range communications. In embodiments, the second communications system can include groups each based on near field communication (NFC) protocols. NFS communication protocols can support communications over distances of a few centimeters.

Each group associated with the first communications system can be coupled to each group associated with the second communications system using a server. In embodiments, each group of the first communications system and each group of the second communications system can include a server with one or more links to each other group. The client link at the server link can include a wired link, a wireless link, a hybrid wired and wireless link, and the like. In embodiments, the link can include a link over a network such as a computer network, a cellular network, etc. The link can enable two-way communications between groups. In embodiments, the link, which can include a link pair, can enable peer-to-peer connectivity between two groups. The peer-to-peer connectivity can enable connectivity between a user device associated with a group and a user device associated with a second group. The connectivity can also include talk groups between the first and second group. Discussed previously and throughout, the connectivity enables data flow between the groups via the link. In embodiments, the data can include voice data, status data, and metadata. The voice data and the metadata can flow on an active link. The status data can flow on an active link pair and on an inactive link pair. In the figure, active links (shown by a solid line) can be configured between group 1 and group 3, and between group 2 and group 3. Group 4 can include a redundant group associated with the second communications system. The link between group 1 and group 4, and the link between group 2 and group 4 can be configured to be inactive (shown by a dotted line) in order to share status data. If group 3 were to fail or become unreachable or unresponsive, then linked redundant group 4 can be enabled, and links to group 3 can be disabled.

FIG. 4 illustrates metadata examples for a communications network using situational inference. Discussed previously and throughout, data collected while monitoring push-to-talk services can include metadata. The metadata, or "data about data", can be associated with various communications such as device-to-device communications and devices associated with talkgroups; communications systems; services such as PTT services provided by different vendors; and so on. Metadata can be useful because the metadata can be examined to identify individual user devices, individual users, device locations, device travel speed and direction, user device service or agency affiliation, and so on. The metadata can provide a meaning or purpose to communications occurring on one or more communications services such as routine communications, emergency communications, mission-critical communications, etc. The metadata enables communications networks using situational inference. Push-to-talk (PTT) services are accessed over a first communications system, wherein the first communications system provides PTT over broadband (PTToB) services, and wherein the first communications system includes server-based connectivity. Additional push-to-talk (PTT) services are provided over a second communications system, wherein the second communications system implements a different network protocol from the first communications system, and wherein the second communications system includes server-based connectivity. A client system is coupled to one or more servers in at least the first communications system. PTT services activity is monitored over the at least the first communications system. A community operational situation is inferred, based on data obtained during the monitoring.

Data such as metadata can be collected while monitoring communications activity. In embodiments, the communications activity can include PTT services activity. Discussed previously, the PTT services activity can include routine or baseline communications, communications associated with an event, anomalous communications, and the like. In embodiments, the system metadata can be associated with community radio communications. The community radio communications can be associated with an event such as a public event, or can be associated with an unusual event such as social unrest, a human-caused or natural disaster, etc. The metadata can include a set of tags, labels, categories, etc. In embodiments, the system metadata can include radio identification, talkgroup identification, talkgroup membership, talkgroup patching, communication duration, communication time of day, communication location, radio status transition, and communication recidivism.

In the illustration 400, example system metadata 410 is described. The radio identification can include a user device number such as an inventory, unit, or reference ID (e.g., a serial number). The ID can include a "hardwired" ID, an assigned ID, a configurable ID, and the like. The radio ID can be provided by a service, an agency, a vendor, and the like. The talkgroup identification can include a number, label, tag, assigned ID, text, configurable ID, etc. The talkgroup ID can be associated with a group type such as a public group, a private group, a restricted group, and so on. The talkgroup ID can include a generic ID such as "Group 1" or "1". The talkgroup membership can include an agency, service, or similar group such as "City Police", "Town EMT", "State Radio Club", and the like. The talkgroup patching can include a current patch between groups, communications systems, etc. The talkgroup patching can include allowed patches between groups, communications systems, and so on. The communication duration metadata can include an amount of time such as elapsed time, start and stop times, etc. The elapsed time can be measured using standardized units such as hours, minutes, seconds, etc. The communications time of day can be referenced to local time or standard time. The standard time reference can include Greenwich Mean time (GMT), Universal Time Coordinated (UTC), etc. The communication location can include an address, such as street name and number, town, county, state, region, country, and so on. The communication location can be referenced to GPS coordinates. The radio status transition can include a transition from user device off to user device on, standby to active, active to standby, user device on to user device off, and the like. The communication recidivism, which is a repeating of a previous communication condition, mode, location, parties, and so on, can be useful for situational inference. For example, multiple communication devices all operating at the same location can indicate a situational hot spot and can be highlighted for a dispatcher. Likewise, multiple communication transmissions between two or more communication parties, such as two firefighters in different vehicles moving toward a common location, can be used to infer a community operational situation.

The example system metadata 410 can include the biometrics of one or more responders. Biometrics such as responder vital signs (heart rate, body temperature, blood pressure, etc.), responder frame of mind (sharpness of voice, loudness of voice, agitation in voice, responder choice of vocabulary, etc.), and so on can be useful for situational inference. In addition, responder vehicle speed and vehicle direction can be useful situational inference factors, along with data messages that can accompany voice transmissions, such as a text message occurring near in time to a voice transmission. Further metadata examples include weather, either for a responder en route or at an incident site, as well as responder en route traffic metrics.

Figure 5:
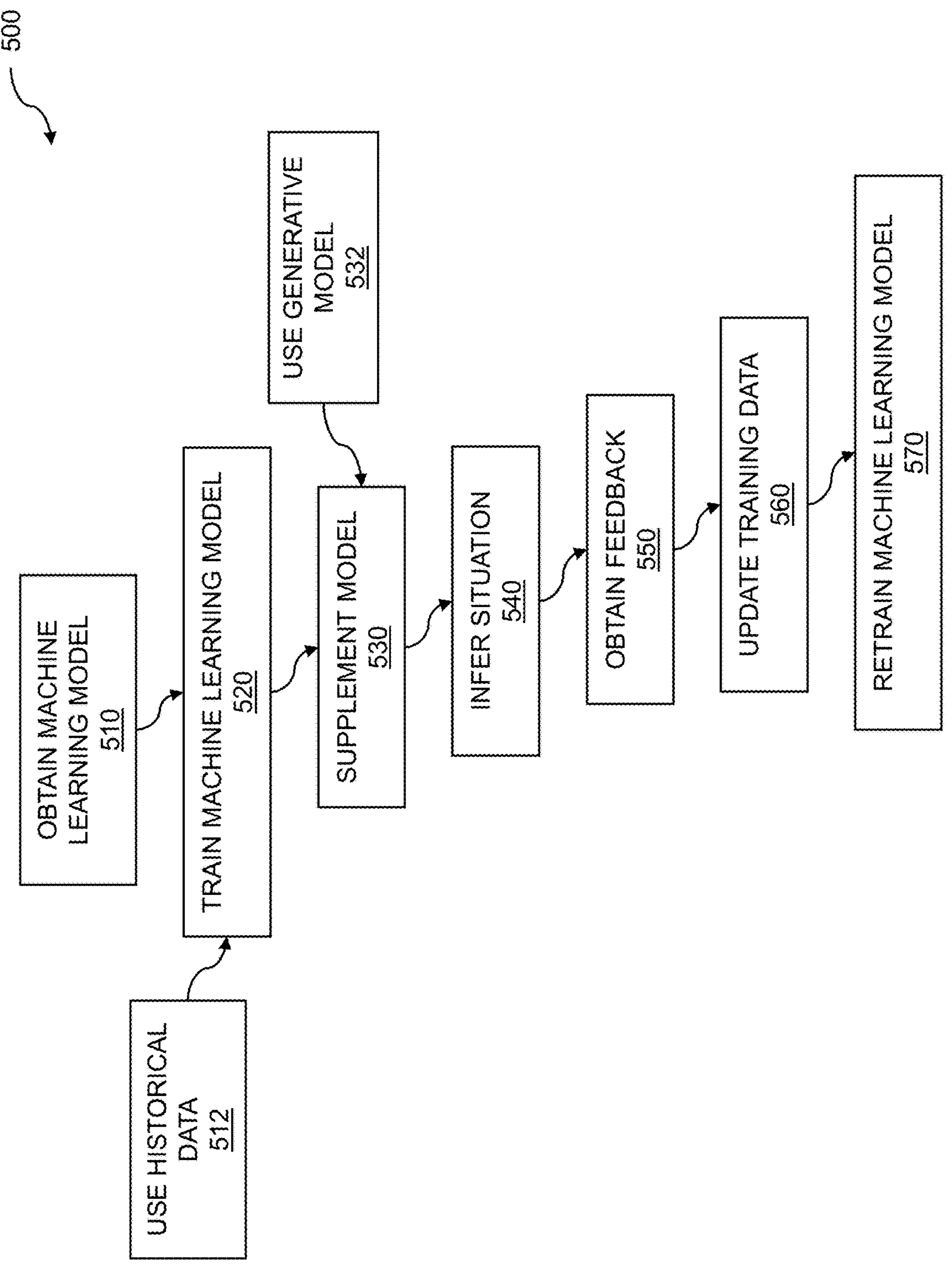
FIG. 5 is a flow diagram for machine learning training.

FIG. 5 is a flow diagram for machine learning training. Artificial intelligence (AI) techniques are frequently used to analyze data. The AI techniques can include developing a model to perform the analysis. The AI model can be developed based on training data and expected results or inferences that the model should produce when successfully trained. The AI model, when trained, can be executed on a network such as a neural network. The neural network includes nodes or artificial neurons and arcs, where the nodes perform an operation such as an arithmetic or logic operation, and the nodes route data between and among nodes. The AI model can do a reasonable job of processing and analyzing data which is similar to the data that was used to train the AI model. However, as new or "previously unseen" data is presented the model for processing, the accuracy and convergence rate of the model can decrease, in some cases significantly. To counter this modeling accuracy degradation, machine learning (ML) techniques can be used. The ML techniques can continually adjust model parameters (e.g., weights and biases) based on the new data. The adjustment of the model can improve model accuracy and convergence rate. The machine learning training enables communications networks using situational inference. Push-to-talk (PTT) services are accessed over a first communications system, wherein the first communications system provides PTT over broadband (PTToB) services, and wherein the first communications system includes server-based connectivity. Additional push-to-talk (PTT) services are provided over a second communications system, wherein the second communications system implements a different network protocol from the first communications system, and wherein the second communications system includes server-based connectivity. A client system is coupled to one or more servers in at least the first communications system. PTT services activity is monitored over the at least the first communications system. A community operational situation is inferred, based on data obtained during the monitoring.

The flow 500 includes obtaining a machine learning model 510. A machine learning model, which can be based on code, instructions, operations, and so on, can apply algorithms, heuristics, etc. to the analysis of data. The machine learning model can be used to find patterns in data, make decisions or inferences about the data, etc. The machine learning model can be uploaded by a user, downloaded from a library or repository of machine learning models, and the like. The machine learning model can be based on a model template. The flow 500 includes training the machine learning model 520. A machine learning model can be trained by applying a dataset to the model. The training can be based on various training techniques such as supervised training, semi-supervised training, unsupervised training, algorithms, heuristics, and so on. Supervised training can include providing a dataset such as a training dataset to the machine learning model. In addition to the data, "expected" results can be provided. The expected results can include expected inferences that the model can make based on the training data. The training dataset can include labeled data. In embodiments, the labeled data is generated by human experts. In a usage example, a series of images of dogs and images without dogs can be provided to train the machine learning model. The expected inferences can include detecting dogs in some images and detecting that there are no dogs in other images. Machine learning model parameters such as weights and biases are be adjusted until the model can effectively detect the presence or absence of dogs within the training images. The semi-supervised training can include providing some labeled data and some unlabeled data to train the machine learning model. The unsupervised training can include analyzing data to identify patterns within the data. In the flow 500, the machine learning is trained by the historical data 512. The historical data can include data collected while monitoring push-to-talk (PTT) services over at least a first communications system. The historical data can be collected from more than one communications system. The historical data can be collected over a period of time such as minutes, hours, days, weeks, months, years, and so on.

In the flow 500, the machine learning is supplemented 530. Training of machine learning models can be improved by providing more data to the model. The machine learning model can evolve over time, as more data is applied to the model and as adjustments are made to weights and biases associated with nodes of the model. Supplying additional, labeled data is challenging, however, since the labeling of the data is generally performed by experts. Other techniques can be applied to provide supplemental data. In the flow 500, the supplementing is accomplished using a generative model 532. A generative model can be used to generate data that can be used to train or to supplement training of the machine learning model. The generative model can generate new data, sometimes referred to as synthetic data, which can resemble real data. In a usage example, training data that includes images containing dogs can be supplemented with images containing what look like dogs. The images that contain what look like dogs can be generated by the generative model. In some embodiments, an adversarial model can be developed, where the adversarial model can be used in conjunction with the generative model. While the generative model generates data, the adversarial model attempts to flag the generated data as fake, synthetic, unrealistic, etc. The two models learn from each other. The generative model learns to produce more realistic synthetic data, and the adversarial model learns to detect the better fakes.

The flow 500 includes inferring a community operational situation 540, based on data obtained during the monitoring. The community operational situation can include usage of one or more communications systems, communication between or among communications systems, interoperability between PTT services provided by different vendors, and so on. The community operational situation can include a public gathering such as a concert or political rally, an emergency event such as a fire or law enforcement action, a natural disaster, and so on. In embodiments, the inferring uses machine learning. The inferring can use the machine learning model to identify possible community operation situations, to track the situations, etc. The inferring community operational situations can be used to provide information, graphics, displays, and so on to agency officials, dispatchers, and others. Further embodiments include creating a hot spot mapping of the community, based on the inferring. The hot spot mapping can map concentrations of user devices that can access one or more communications systems, levels of PTT activities, and the like. In further embodiments, an operational alert can be delivered, based on the inferring. The alert can include a message such as a text message, an email message, an icon on a display, etc.

The flow 500 includes obtaining feedback 550. The feedback can include relevance of one or more inferences, inference accuracy, speed of convergence, and so on. The feedback can be provided by users such as emergency services, law enforcement, or military officials; dispatchers; experts; and the like. The feedback can be based on evaluating an objective function. The flow 500 includes updating training data 560. The updating training data can include providing more labeled training data, collecting more historical data, generating more synthetic data, and so on. The updating can be based on the feedback that was obtained from one or more sources. The flow 500 includes retraining the machine learning model 570. The retraining can include providing the updated training data, historical data, synthetic data, and so on to the machine learning model. The retraining can include adjusting weights, where the weights can be associated with inputs to a node. The retraining can further include adjusting biases associated with the nodes. In embodiments, obtaining feedback, updating training data, and retraining the machine learning model can be repeated or "looped". The retraining the machine learning model can further be based on discovery by the machine learning model of trends in the data.

Figure 6:
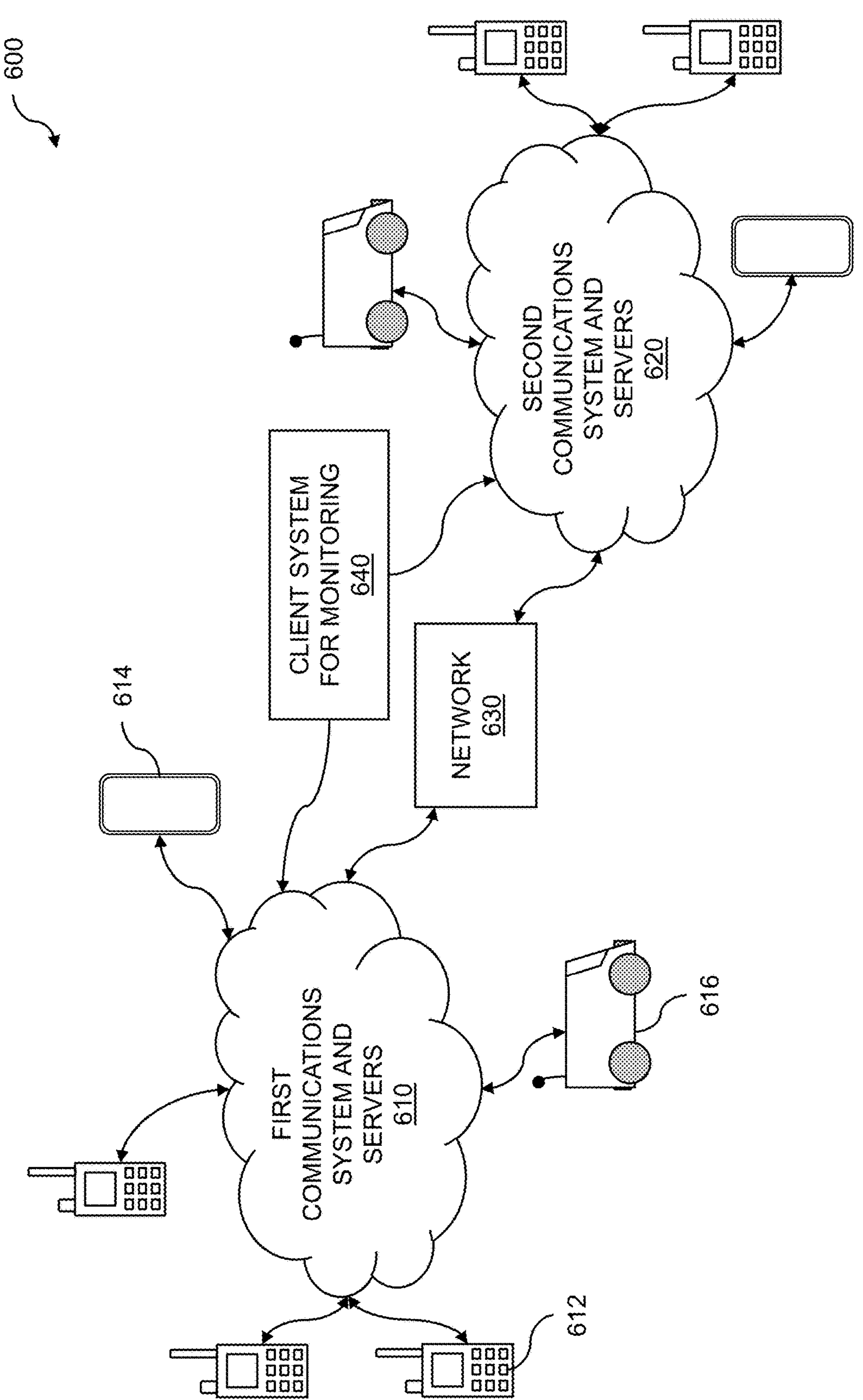
FIG. 6 is an infographic for a first and second communications system.

FIG. 6 is an infographic for a first and second communications system. Discussed previously and throughout, machine learning techniques can be applied to collecting, collating, analyzing, etc. data collected while monitoring push-to-talk (PTT) services activity. The PTT services activity can be associated with one or more communications systems. One or more community operational situations can be inferred from the monitored PTT services. The inferred situations can be used to create a hot spot mapping of the community operational situations. In addition, an operational alert can be delivered to an official, a dispatcher, and so on. The official or dispatcher can then initiate an appropriate response to a community operation situation, can monitor or update a response to the situation, and so on. The hot spot mapping and the delivered alert can greatly benefit an official or dispatcher by quickly drawing their attention to an existing, developing, or new situation. The attention can be drawn by highlighting the situation, "zooming in" on the situation, and the like. The PTT services can include communications techniques such as LTE, LMR, or the like. The monitoring of PTT services activities and the inferring community operational situations are enabled by communications networks using situational inference. Push-to-talk (PTT) services are accessed over a first communications system, wherein the first communications system provides PTT over broadband (PTToB) services, and wherein the first communications system includes server-based connectivity. Additional push-to-talk (PTT) services are provided over a second communications system, wherein the second communications system implements a different network protocol from the first communications system, and wherein the second communications system includes server-based connectivity. A client system is coupled to one or more servers in at least the first communications system. PTT services activity is monitored over the at least the first communications system. A community operational situation is inferred, based on data obtained during the monitoring.

The infographic 600 can include a first communications or "comms" system with servers 610. The first communications system can provide services such as push-to-talk (PTT) services. The push-to-talk services can include half-duplex, repeater, or similar operations. The communications system can use one or more frequency bands, channels, and so on to enable communication. In embodiments, the communications system can be based on low-VHF, VHF, UHF, and similar bands. One or more channels can be associated with each band. The bands that are used can include licensed and unlicensed spectra. The communications system can include one or more communications modes such as FM, narrowband FM, and so on. The communications modes can be based on analog or digital techniques. Various types of user devices can be associated with the first communications system. One or more servers can be associated with the first communications system. The servers can include processors, computers, and so on. The servers can have access to one or more networks. The networks can include wired and wireless networks, such as computer networks (e.g., the Internet), cellular networks, and the like. The servers can provide and receive data from other servers where the provided and received data can include voice data, text message data, video data, etc., depending on the capabilities of the communications network. The servers can further handle system-specific data. In embodiments, the data can include system metadata. The system metadata can include system identifiers, user device identifiers, user location identifiers, etc. In embodiments, the system metadata can include radio identification, talkgroup identification, talkgroup membership, talkgroup patching, communication duration, communication time of day, communication location, radio status transition, and communication recidivism.

The infographic 600 can include a first user device 612. The first user device can be used by an individual to communicate with another individual, with a group such as a talk group, and so on. The communication can include audio, text, video, and the like, depending on the capabilities of the first user device. The first user device can include a handheld transceiver (HT) or "walkie talkie". The HT can be configured to connect to the first communications system. In embodiments, the HT can connect to the communications system using one or more power levels, channels or frequencies, access tones or codes, and so on. When a plurality of users accesses the first communications system, more than one HT or other user device can connect to the first communications system. In other embodiments, the first device can include a telephonic device such as a smartphone 614. A transceiver (not shown) can be coupled to the smartphone to connect to the first communications system. A transceiver app can be loaded onto the smartphone, where the app enables the smartphone to access the first communications system. In further embodiments, the first device can include a mobile transceiver 616. The mobile transceiver can be mounted in a vehicle such as a car, van, or truck; an aircraft such as a plane, helicopter, drone, or balloon; etc. One or more user devices of one or more user device types can be connected to the first communications system.

The various devices that are configured to access the first communications system can communicate among themselves. The communications within the first communications system can include one-to-one communication, where a first user device connects to a second user device. The communications within the first communications system can further include one-to-many communication, many-to-many communication, and so on. The communication among more than two user devices can include communication within a talk group. The user devices associated with a communications system such as the first communications system can communicate between and among themselves using a repeater, two or more linked repeaters, etc. The infographic 600 can include a second communications system and servers 620. The second communications system can be substantially similar to or substantially different from the first communications system. The first communications system and the second communications systems can include LMR, LTE, or other communications systems. In embodiments, the first communications system and the second communications system are operated independently. The independently operated communications systems can be operated by governmental or emergency services, commercial enterprises, trained amateur operators, etc. In embodiments, the second communications system can be based on Land Mobile Radio protocols (LMR). The LMR protocols can include substantially similar or substantially different channels, access codes, compression schemes, encryption techniques, etc. In embodiments, the second communications system can include services from two or more different vendors. The first communications system and/or the second communications system can be based on other protocols, techniques, etc. In embodiments, the second communications system can be based on near field communication (NFC) protocols. Various user devices can communicate using the second communications system. The devices can include one or more user device types. The user device types can include HTs, smartphones coupled to transceivers, smartphones loaded with apps that enable communication using the second homogeneous communications system, mobile user devices, etc.

The communications systems can include one or more groups such as homogeneous groups. The homogeneous groups can include user devices configured to operate with that group. The homogeneous groups can be based on a similar communications technique, where the communications technique can include LTE, LMR, and so on. The homogeneous groups can include a variety of user devices such as HTs, mobile units, telephones, etc., where each user device is able to access the communications system. While homogeneous groups can be based on a substantially similar communications technique, the groups can include substantially similar channels and configurations or substantially different channels and configurations. The second communications system can include one or more groups such as homogeneous groups. In embodiments, each group of the first communications system and each group of the second communications system can include a server as described previously. Each server can include one or more links, network connections, and so on, between groups associated with each communications system, between groups associated with different communications systems, etc. In the infographic 600, servers can be interconnected using a network 630. The network can support one or more links between two or more servers. The network can include a wired, wireless, or hybrid wired-wireless network. The network can include a computer network such as the Internet, a wireless network such as a cellular or LMR network, and the like. An LMR network can include a network comprising a plurality of LMR repeaters.

The infographic 600 can include a client system 640. The client system 640 can be used for monitoring PTT services activities in one or more communications systems such as communications system 1 and communications system 2.

The client system for monitoring can monitor more than two communications systems. The monitoring can include obtaining data. In embodiments, the data can include system metadata. The system metadata can include data associated with user devices, users, communications systems, networks, and so on. In embodiments, the system metadata can be associated with community radio communication. Community radio communication can be associated with law enforcement, emergency services, amateur radio support for community events, etc. In embodiments, the system metadata can include radio identification, talkgroup identification, talkgroup membership, talkgroup patching, communication duration, communication time of day, communication location, radio status transition, and communication recidivism. The data that is collected can be analyzed, correlated, saved, and the like. In other embodiments, the data can include audio data. The audio data can include audio associated with routine radio transmissions, radio transmissions associated with emergency events, etc. Various data analysis techniques can be applied to the audio data. Further embodiments can include performing speech recognition on the audio data to extract audio keywords. Audio keyword phrases can also be extracted. Discussed throughout, the audio keywords can be used as a basis for inferring one or more community operational situations.

Various types of data can be exchanged between communications systems using a network. In embodiments, the data can include a text message, individual voice call, talkgroup voice call, information message, etc. The network can include a wired, wireless, or hybrid wired/wireless network, a wired or wireless back channel, one or more leased lines, the Internet, and so on. The network can include redundant communications paths. The data can include an information message. In embodiments, the information message can include a text message. The text message can include a Talker ID associated with a user device using the first communications system. In embodiments, receiving the data and a message such as the text message can be accomplished by a client application running on the second user device, a PTT client, and so on. The received data and the message can be displayed on a device coupled to a display. The device can include a user device associated with the second communications system. The message can be used to provide key information such as Talker ID information associated with the first user device. In embodiments, the displaying can further include replacing, by the client application running on the second user device, an ordinary user ID from the first communications system with the Talker ID associated with the first user device. In embodiments, the first communications system 610 can be considered to include attached devices such as the first user device 612, the smartphone 614, the mobile transceiver 616, etc. In embodiments, the second communications system 620 can be considered to include attached devices such as user devices, smartphones, mobile transceivers, etc.

Various techniques can be used to provide information, mission-critical information, and so on, between and among user devices associated with one or more communications systems. In embodiments, the information can be provided using one or more messaging techniques. Messaging can be used to provide Talker ID, mission-critical information, community operational situation information, agency operational information, and the like between communications systems as described. Numerous communications scenarios exist in which a plurality of agencies require communications within each agency and between one or more additional agencies. Such scenarios include natural disasters, political unrest, terrorist attacks, and so on. Agencies such as public safety, emergency services, and government agencies must coordinate their responses to a given situation such as a community operational situation. Traditionally, interoperability between agencies was discouraged so as to avoid spurious communications by unauthorized personnel, to maintain channel integrity or security, and so on. However, after massive terrorist events such as 9/11 in the United States, 7/11 in Great Britain, and the November 2015 Paris attacks; and natural disasters such as Hurricane Katrina; an inability to communicate between and among agencies further complicated already complex situations. As a result, the ability to communicate among agencies became paramount. Complete replacement of existing communications system was prohibitively expensive, so the ability to provide inter-communications systems connectivity was sought instead. While users of different communications systems can be interconnected, key data such as Talker ID data is made generic, obscured, or even lost. In disclosed embodiments, information messages containing useful data such as Talker ID data and GPS data can be provided by one communications system to a second communications system. The information message can be provided without requiring a deep connection and an extensive system-to-system interface.

Communication information, including voice and state information such as emergency or mission-critical information, can be exchanged between a first communications system to a second communications system. Information exchange between these communications systems can be accomplished by an ordinary user, which successfully enables communications but does not provide key information such as Talker ID. Providing Talker ID of the talking on the originating system (TOS) is highly desirable since such data confirms identify of a talker, enables access, and the like. A typical client user device, such as a third-generation partnership project (3GPP)-compliant client, can be used on a mission-critical push-to-talk (MCPTT) communications system. In embodiments, the 3GPP on an MCPTT communications system can make voice calls, can send text messages, and can send data messages such as mission-critical data (MCData) messages. The voice calls, text messages, and MCData messages can be sent to an individual, a talk group, and so on. These voice and data capabilities can enable sharing of Talker ID and other information between communications systems. In embodiments, further information can be exchanged between or among communications systems including video date and files.

In a usage example, an individual accessing one communications system can initiate a call to an individual or a talk group in a second communications system. The call can be enabled by a typical 3GPP-compliant client. The 3GPP-compliant client can send an information message substantially simultaneously. In embodiments, the communication message, which can include a text message, can include the TOS information described above. The call and the text message can be received and displayed using hardware techniques, software techniques, and so on. In embodiments, an unmodified MCPTT client can have access to the data in the text message. The data can be rendered on a display associated with the MCPTT client. In further embodiments, an MCPTT client app can be used on various devices such as HTs, smartphones, and so on. The MCPTT client app can recognize that the text message contains TOS information, can suppress the message from being shown along with other standard text messages, and can "spoof" the Talker ID with the TOS data. The spoofing the Talker ID enables display of an actual Talker ID rather than a generic or "common" user Talker ID. The 3GPP-compliant client can also send an MCData message that includes the TOS information.

Further information can be sent from one communications system to a second communications system when initiating a 3GPP-compliant call, a text message, and so on. In embodiments, the further information can include global positioning system (GPS) data. The GPS data can include latitude and longitude information. The GPS data can include a representation of the location of one or more user devices, where the representation can be unreadable by a human user. An app can be used to convert the GPS data into a usable format. The usable format can include rendering latitude and longitude using degrees, minutes, and seconds; decimal degrees such as Latitude: 43.893978, Longitude: −72.088991; and so on. The implementing a GPS format can include using the GPS coordinates to pin a location on a map. The map can include a standard map, a road map, a hybrid map, a contour map, a satellite map, and the like.

Figure 7:
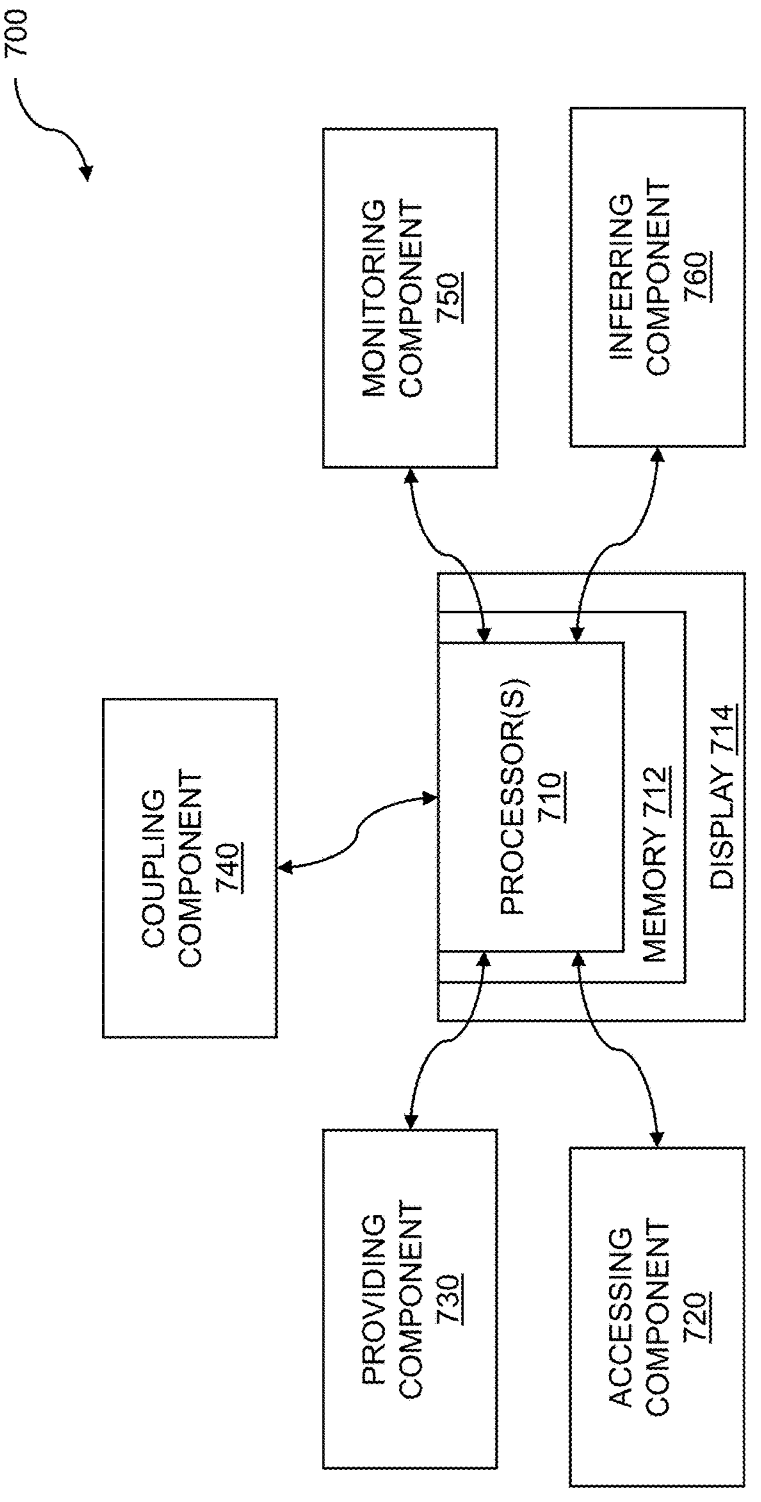
FIG. 7 is a system diagram for communications networks using situational inference.

FIG. 7 is a system diagram for communications. The communications are enabled by communications networks using situational inference. The system 700 can include one or more processors 710, which are coupled to a memory 712 which stores instructions. The system 700 can further include a display 714 coupled to the one or more processors 710 for displaying data such as voice data information, status data such as status associated with one or more communication links, metadata, emergency information, talker IDs, GPS data, community operational situation inferences, historical data, and so on. In embodiments, one or more processors 710 are coupled to the memory 712, wherein the one or more processors, when executing the instructions which are stored, are configured to: access push-to-talk (PTT) services over a first communications system, wherein the first communications system provides PTT over broadband (PTToB) services, and wherein the first communications system includes server-based connectivity; provide additional push-to-talk (PTT) services over a second communications system, wherein the second communications system implements a different network protocol from the first communications system, and wherein the second communications system includes server-based connectivity; couple a client system to one or more servers in at least the first communications system; monitor PTT services activity over the at least the first communications system; and infer a community operational situation, based on data obtained during the monitoring.

The system 700 can include an accessing component 720. The accessing component 720 can include logic and functions for accessing push-to-talk (PTT) services over a first communications system, wherein the first communications system provides PTT over broadband (PTToB) services, and wherein the first communications system includes server-based connectivity. The PTT services can include simplex, half-duplex, or full duplex operations, one-to-many operations, a talk group, and so on. The first communications system can include a wireless communications system such as a cellular communications system. The cellular communications system can be based on one or more cellular protocols. The cellular communications system can support PTT over broadband (PTToB) or broadband push to talk (BBPTT) services. The PTToB services can be accessed using a cellular device such as a smartphone. The smartphone can access the PTToB services using an app, a hardware element coupled to the smartphone, a combination of an app and a hardware element, and so on. In embodiments, the broadband services of the first communications system can be based on cellular protocols. A variety of cellular protocols can be used. In embodiments, the cellular protocols can include long-term evolution (LTE) protocols. The cellular protocols can further include 5G protocols. The PTToB services can be based on wired broadband services such as Ethernet, cable or fiber, wireless broadband services such as 802.11 variants, and so on. The broadband services can be provided using hybrid services based on wired and wireless services. The broadband services can include a private network, a virtual private network, a commercial network, a public network, a secure network, etc. The server-based connectivity associated with the first communications system can enable connection by one or more types of user devices to the first communications system. One or more servers that enable the server-based connectivity can enable communications to, from, and among the user devices. The servers can further gather data, process data, form inferences about the data using machine learning models, etc.

The PTT services provided by the second communications system can be substantially similar to or substantially different from the PTT services provided by the first communications system. The second communications system can include a wireless communications system such as an LMR communications system an LTE or 5G communications system, etc. The LMR communications system can enable communications among substantially similar groups to those groups associated with the first communications system, substantially different groups, and the like. The second communications system can use channels substantially similar to or substantially different from channels used by the first communications system. In a usage example, the first communications system can be based on an LTE communication technique and the second communications system can be based on an LMR technique. More than one LMR standard can be used by groups associated with the example second communications system.

The system 700 can include a providing component 730. The providing component 730 can include logic and functions for providing additional push-to-talk (PTT) services over a second communications system, wherein the second communications system implements a different network protocol from the first communications system, and wherein the second communications system includes server-based connectivity. The PTT services provided by the second communications system can be substantially similar to or substantially different from the PTT services provided by the first communications system. In embodiments, the second communications system can be based on Land Mobile Radio protocols (LMR). The LMR protocols can include communications channels, access codes, compression techniques, encryption techniques, and so on. More than one LMR protocol can be included. In embodiments, the second communications system can include services from two or more different vendors. The different vendors can include vendors to military, law enforcement, emergency services, and other agencies and services. The different vendors can include vendors to civilian organizations such as amateur radio operators. The LMR communications system can enable government and emergency services, enterprises, government, and personal communications, etc. The wireless communications system can be based on low-VHF frequencies, VHF frequencies, UHF frequencies, SHF frequencies, and so on. The system can access licensed and unlicensed communications bands. The system can be based on one or more power levels including a maximum power level for the bands. The second communications system can accomplish communications over distances long, medium, short, near, etc. In embodiments, the second communications system can be based on near field communication (NFC) protocols. The NFC protocols can support communications over distances up to approximately 10 cm.

The communications systems can include analog modes such as FM and narrow band FM, digital modes such as Next Generation Digital Narrowband (NXDN™), Project 25 (P25), and the like. Digital modes can be classified generally as a digital mobile radio (DMR) subset of LMR. In embodiments, the communications channels can include encrypted and unencrypted communications. The at least two groups associated with the first communications system can include groups based on cellular communications, groups based on mobile communications, and so on. Cellular groups can be based on Long Term Evolution (LTE), 5G, and the like. Mobile groups can be based on Land Mobile Radio (LMR). The at least two groups can include redundant groups, where at least one group is active while the other group is inactive. The at least two groups can include two or more active groups. A group included in the first communications system can be in communication with a group in a second communications group. Devices such as user devices that can access the first communications system can include handheld devices such as handheld transceivers (HTs) or walkie-talkies, mobile transceivers, repeaters, cross-band transceivers, base stations, etc. The user devices can also include telephonic devices such as a smartphone, where the smartphone can be loaded with a communications app or similar software. In embodiments, the first user device can be Third Generation Partnership Project (3GPP)-compliant. 3GPP-compliance can enable radio access technologies such as Universal Terrestrial Radio Access™ (UTRA), Frequency Division Duple (FDD), etc.

The system 700 can include a coupling component 740. The coupling component 740 can include logic and functions for coupling a client system to one or more servers in at least the first communications system. The client system can include a client app, a hardware element that supports the client, a hybrid hardware-software client, and so on. In embodiments, the client can include a compliant client such as a third-generation partnership project (3GPP) compliant client. The 3GPP compliant client can include a client on a mission-critical push to talk (MCPTT) system. In embodiments, the coupling a client system to one or more servers can include two or more communications systems. The two or more communications systems can be based on substantially similar communications protocols, substantially different communications protocols, etc. The communication protocols can include LTE protocols, LMR protocols, and so on. In embodiments, the communications systems can include services from two or more different vendors. The different vendor services can be based on different configurations, channels, access codes, compression techniques, encryption techniques, and the like. In embodiments, the first communications system and the second communications system can be coupled to each other using the server-based connectivity. The server-based connectivity can include the servers providing interoperability capabilities. The server-based connectivity can include connection to the servers via a network. The network can include a wired connection, a wireless connection, a hybrid wired and wireless connection, etc. The server-based connectivity can include peer-to-peer connectivity. The servers can further be used to collect data. The data that is collected can include communications system usage data, location data, cluster data, and the like. In embodiments, the first communications system and the second communications system operate incommunicado. The operation of the first and second communications systems can be accomplished without interfering with normal operations of each communications system.

The system 700 can include a monitoring component 750. The monitoring component 750 can include logic and functions for monitoring PTT services activity over at least the first communications system. The monitoring can include collecting data associated with individual users, devices, and so on, who or what is engaged in an interaction, etc. In embodiments, the data can include system metadata. The system metadata can include a variety of system identifiers, system configurations, etc. In embodiments, the system metadata can include radio identification, talkgroup identification, talkgroup membership, talkgroup patching, communication duration, communication time of day, communication location, radio status transition, and communication recidivism. The interaction can include a user-to-user call, a group call, a chat, and the like. The monitoring can include collecting other data such as GPS or other location data, user and user device clustering, user and device motion such as walking or traveling in a vehicle, etc. In embodiments, the system metadata can be associated with community radio communication. The data can further include other types of data. In embodiments, the data can include audio data. The audio data can be analyzed for audio content. Further embodiments can include performing speech recognition on the audio data to extract audio keywords. The extracted audio keywords can be associated with various agencies and services such as military, law enforcement, public safety, etc. In embodiments, the inferring can be based on the audio keywords.

The data that is collected can be processed. The processing can be accomplished using one or more processors associated with the servers, additional processors, and so on. The data processing can include comparing data. Further embodiments can include comparing the data that was obtained with historical monitoring data collected over time. The historical monitoring data can include data collected over hours, days, weeks, months, years, etc. The historical data can be collected from one or more servers. In embodiments, the comparing the data can include data collation. The data collation can include collecting data from a plurality of servers and collating that data. The data collation can include collating data collected from a server with the historical data. In embodiments, the comparing the data can include data analysis. The data analysis can include identifying trends in the data, similarities in the data, anomalies in the data, etc. The data analysis can be based on one or more classifiers. The data analysis using classifiers can be accomplished using a network such as a neural network. The neural network can be trained using one or more machine learning techniques.

The system 700 can include an inferring component 760. The inferring component 760 can include logic and functions for inferring a community operational situation, based on data obtained during the monitoring. A community operational situation can include monitoring a crowd at event such as a political rally, sporting event, or concert; determining that an event such as a small scuffle, a brawl, or a riot is occurring; recognizing a developing event such as a natural or human-caused disaster; and so on. Depending on a particular event, a variety of responses can be initiated. In embodiments, the community operational situation can include emergency response activities. The emergency response activities can include actions taken by law enforcement, fire, and ambulance services; military responses; activities such as opening emergency shelters, warming centers; etc. In embodiments, the inferring can use machine learning. A network such as a neural network can be trained to form inferences based on data obtained during the monitoring. The neural network can adapt based on machine learning techniques. The training can be accomplished using a "training dataset", where a training dataset comprises data and expected inferences for the data. In embodiments, the machine learning can be trained by the historical data. The historical data can be analyzed to determine expected inferences for the historical data. The historical data and the expected inferences can be used to train the neural network for machine learning. However, obtaining and analyzing sufficient data to train a neural network for machine learning is extremely complex and time consuming. Nonetheless, training improves by using more training data. In embodiments, machine learning can be supplemented using a generative model. A generative model can be used to create synthetic data, where the synthetic data can be substantially similar to the "real" historical data. The generative model generates data for training purposes. The more accurate the generative model, the more appropriate the training data. The generative model can be used to generate training data that can be used to eliminate or minimize biases in the training data. The biases in the training data derive from a training dataset that is not sufficiently diverse to community operational situations that can vary based on location, culture, etc.

Examples of data and inferences that can be derived from the data can be illustrative. Examples of data collected during monitoring can include: a user U talked to a talkgroup TG at GMT time T for S seconds using communications system Sy1; a user U was at GPS location G at GMT time T; a talkgroup membership TG comprises users U1, U2, and U3; user U presence status transitioned to state P at GMT time T; and talkgroup TG1 and system Sy1 and talkgroup TG2 on system Sy2 were coupled or patched together at GMT time T. The example data and other data can be collated, correlated, analyzed, and so on to generate inferences. Example inferences can include: user U1 was conversing with user U2 on talkgroup TG1 between GMT times T1 and T2; user U1 and user U2 had multiple conversations on multiple talkgroups and were therefore working together between GMT times T1 and T2; user U1 is normally present (online) between GMT times T1 and T2 each day; user U1 on system Sy1 was conversing with user U2 on system Sy2 using patched talkgroup/system TG1/Sy1 and talkgroup/system TG2/Sy2 between times GMT T1 and T2; and on last Thursday, user U1 on system Sy1 and user U2 on system Sy2 were in close proximity to each other for most of the day, often moving at highway speeds. Further inferences that can be derived from the last inference about users U1 and U2 on the previous Thursday can include: users U1 and U2 may be the same person carrying two devices; or the users U1 and U2 may be two individuals working and traveling in the same vehicle together.

The inferences that can be generated by the machine learning can be used for a variety of purposes. The purposes can include enhancements to and notifications of community operational situations to dispatchers and others. In a usage example, an emergency services dispatcher can monitor a variety of data sources such as traffic cameras, surveillance cameras, high-intensity sound monitors (e.g., gunshot detectors), and so on. Inferences generated by the machine learning can be used to select relevant data from the plurality of data feeds provided to a dispatcher. The highlighted data can include possible, developing, or new community operational situations. Further embodiments can include creating a hot spot mapping of the community, based on the inferring. The hot spot mapping can include centrally displaying inferred data, providing visual highlighting, icons, or graphics, and so on. Further embodiments can include delivering an operational alert, based on the inferring. An operational alert can include an automatic text message (e.g., SMS), email message, phone call, radio call, etc.). In embodiments, the operational alert can be delivered to a dispatcher monitoring one or more communications systems. The operational alert can include a message such as a flashing message on a display visible to the dispatcher and others.

The system 700 can include a computer program product embodied in a non-transitory computer readable medium for communications, the computer program product comprising code which causes one or more processors to perform operations of: accessing push-to-talk (PTT) services over a first communications system, wherein the first communications system provides PTT over broadband (PTToB) services, and wherein the first communications system includes server-based connectivity; providing additional push-to-talk (PTT) services over a second communications system, wherein the second communications system implements a different network protocol from the first communications system, and wherein the second communications system includes server-based connectivity; coupling a client system to one or more servers in at least the first communications system; monitoring PTT services activity over the at least the first communications system; and inferring a community operational situation, based on data obtained during the monitoring.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for communications comprising:

accessing push-to-talk (PTT) services over a first communications system, wherein the first communications system provides PTT over broadband (PTToB) services, and wherein the first communications system includes server-based connectivity;

providing additional push-to-talk (PTT) services over a second communications system, wherein the second communications system implements a different network protocol from the first communications system, and wherein the second communications system includes server-based connectivity;

coupling a client system to one or more servers in at least the first communications system;

monitoring PTT services activity over the at least the first communications system; and inferring a community operational situation, based on data obtained during the monitoring.

2. The method of claim 1 wherein the coupling a client system to one or more servers includes two or more communications systems.

3. The method of claim 1 wherein the first communications system and the second communications system are coupled to each other using the server-based connectivity.

4. The method of claim 1 wherein the first communications system and the second communications system operate incommunicado.

5. The method of claim 1 further comprising comparing the data that was obtained with historical monitoring data collected over time.

6. The method of claim 5 wherein the comparing the data includes data collation and/or analysis.

7. The method of claim 5 further comprising modifying the community operational situation, based on the comparing.

8. The method of claim 1 further comprising creating a hot spot mapping of the community, based on the inferring.

9. The method of claim 1 further comprising delivering an operational alert, based on the inferring.

10. The method of claim 9 wherein the operational alert is delivered to a dispatcher monitoring one or more communications systems.

11. The method of claim 1 wherein the community operational situation includes emergency response activities.

12. The method of claim 1 wherein the data includes system metadata.

13. The method of claim 12 wherein the system metadata is associated with community radio communication.

14. The method of claim 1 wherein the data includes audio data.

15. The method of claim 14 further comprising performing speech recognition on the audio data to extract audio keywords.

16. The method of claim 15 further comprising analyzing the audio keywords to develop a situational heat map.

17. The method of claim 1 wherein the data is associated with a particular community operational situation.

18. The method of claim 1 wherein the inferring includes a correlation factor.

19. The method of claim 18 wherein the correlation factor represents a trueness or falseness metric.

20. The method of claim 1 wherein the broadband services of the first communications system are based on cellular protocols.

21. The method of claim 20 wherein the cellular protocols include long-term evolution (LTE) protocols.

22. The method of claim 20 wherein the second communications system is based on Land Mobile Radio protocols (LMR).

23. The method of claim 22 wherein the second communications system includes services from two or more different vendors.

24. The method of claim 22 wherein the second communications system is based on near field communication (NFC) protocols.

25. A computer program product embodied in a non-transitory computer readable medium for communications, the computer program product comprising code which causes one or more processors to perform operations of:

accessing push-to-talk (PTT) services over a first communications system, wherein the first communications system provides PTT over broadband (PTToB) services, and wherein the first communications system includes server-based connectivity;

providing additional push-to-talk (PTT) services over a second communications system, wherein the second communications system implements a different network protocol from the first communications system, and wherein the second communications system includes server-based connectivity;

coupling a client system to one or more servers in at least the first communications system;

monitoring PTT services activity over the at least the first communications system; and inferring a community operational situation, based on data obtained during the monitoring.

26. A computer system for communications comprising:

a memory which stores instructions;

one or more processors coupled to the memory wherein the one or more processors, when executing the instructions which are stored, are configured to:

access push-to-talk (PTT) services over a first communications system, wherein the first communications system provides PTT over broadband (PTToB) services, and wherein the first communications system includes server-based connectivity;

provide additional push-to-talk (PTT) services over a second communications system, wherein the second communications system implements a different network protocol from the first communications system, and wherein the second communications system includes server-based connectivity;

couple a client system to one or more servers in at least the first communications system;

monitor PTT services activity over the at least the first communications system; and infer a community operational situation, based on data obtained during the monitoring.

* * * * *